(No Model.)  4 Sheets—Sheet 1.
J. H. SIMPSON.
DIE FOR MAKING TURN BUCKLES.
No. 402,693.  Patented May 7, 1889.
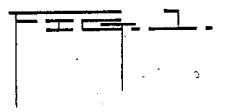
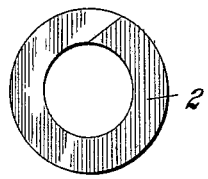
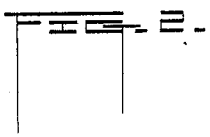
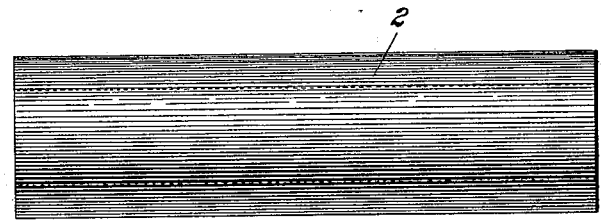
WITNESSES.
INVENTOR.

(No Model.) 4 Sheets—Sheet 2.

J. H. SIMPSON.
DIE FOR MAKING TURN BUCKLES.

No. 402,693. Patented May 7, 1889.

WITNESSES.
H. S. Morrow.
W. B. Corwin

INVENTOR.
James H. Simpson
by W. Bakewell & Sons
his Attorneys (No Model.) 4 Sheets—Sheet 3.
J. H. SIMPSON.
DIE FOR MAKING TURN BUCKLES.
No. 402,693. Patented May 7, 1889.
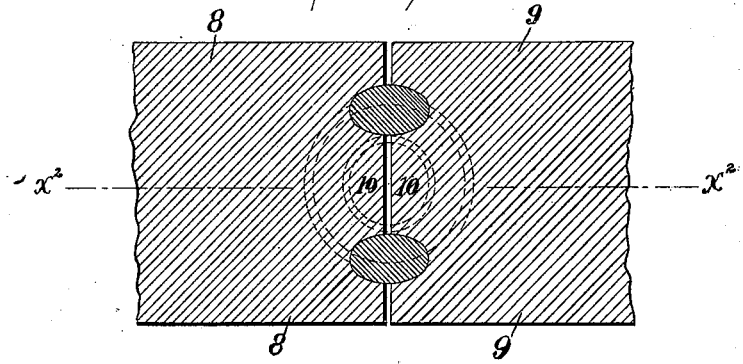
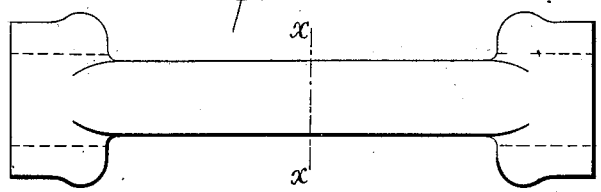
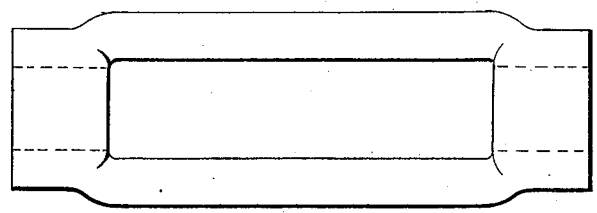
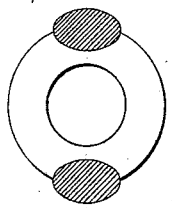
WITNESSES.
H. S. Morrow.
W. J. Corwin.
INVENTOR.
James H. Simpson
by W. Bakewell & Sons
his Attorneys (No Model.) 4 Sheets—Sheet 4.

J. H. SIMPSON.
DIE FOR MAKING TURN BUCKLES.

No. 402,693. Patented May 7, 1889.

WITNESSES.
H. S. Morrow.
W. B. Corwin

INVENTOR.
James H. Simpson
by W. Bakewell & Sons
his Attorneys

UNITED STATES PATENT OFFICE.

JAMES H. SIMPSON, OF PITTSBURG, PENNSYLVANIA, ASSIGNOR TO CARNEGIE, PHIPPS & COMPANY, (LIMITED,) OF SAME PLACE.

DIE FOR MAKING TURN-BUCKLES.

SPECIFICATION forming part of Letters Patent No. 402,693, dated May 7, 1889.

Application filed October 8, 1888. Serial No. 287,506. (No model.)

*To all whom it may concern:*

Be it known that I, JAMES H. SIMPSON, of the city of Pittsburg, in the county of Allegheny and State of Pennsylvania, have invented a new and useful Improvement in Dies for Making Turn-Buckles; and I do hereby declare the following to be a full, clear, and exact description thereof.

Figure 3:
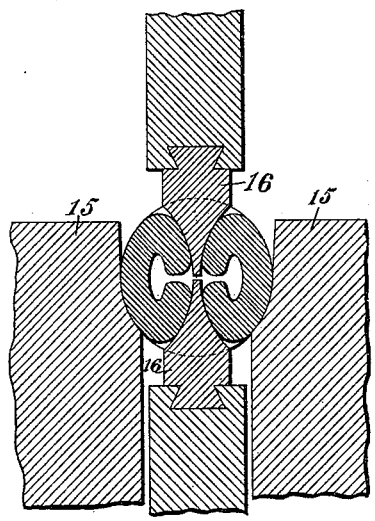
Figure 4:
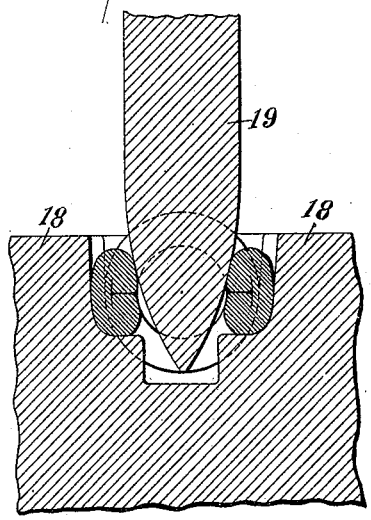
Figure 5:
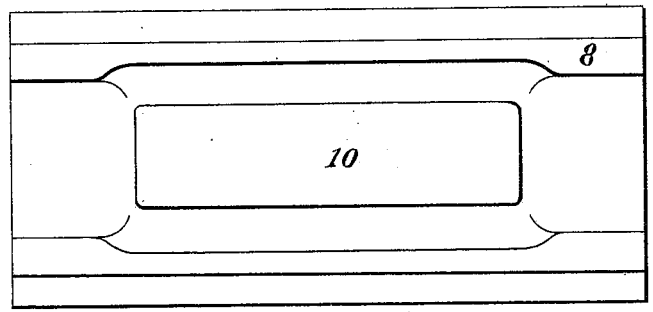
Figure 6:
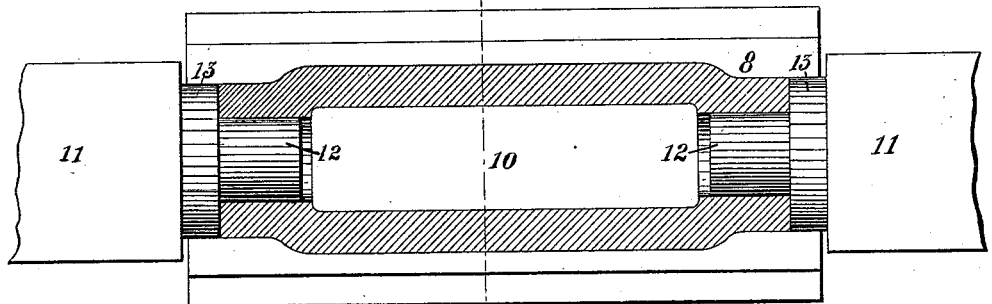
Figure 11:
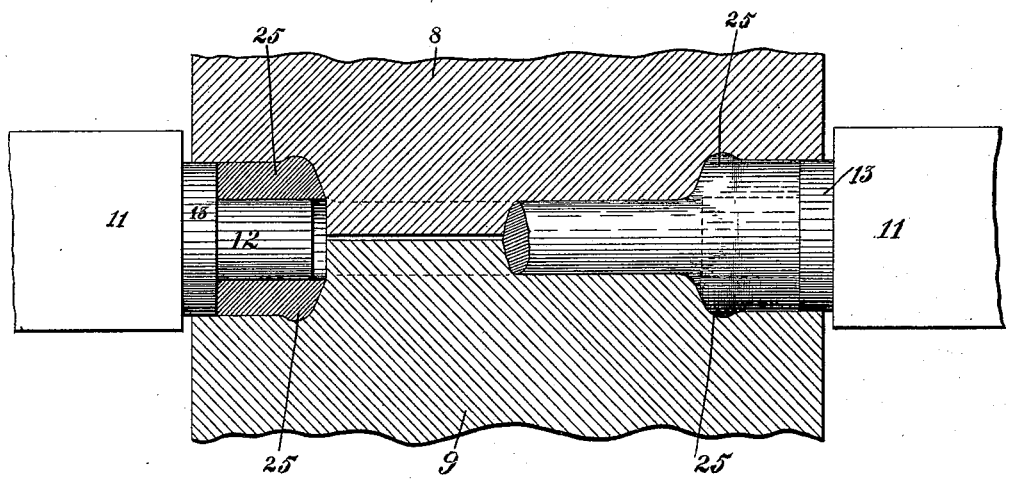
Figure 12:
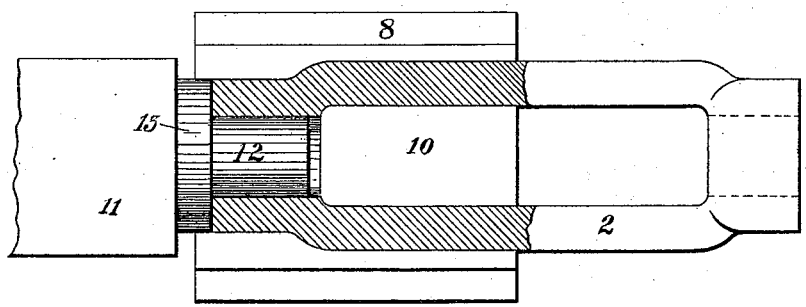

In the accompanying drawings, Figure 1 is an end view of a hollow blank from which the turn-buckle is made. Fig. 2 is a plan view thereof. Fig. 3 is a vertical cross-sectional view of a pair of dies for splitting or cutting the blank without removing a piece therefrom. Fig. 4 is a view of the expander by which the sides of the cut blank are spread. Fig. 5 is a plan view of one of the dies which I use in shaping the straps of the turn-buckle. Fig. 6 is a similar view showing a turn-buckle therein in longitudinal section, and showing, also, the mandrels by which the nuts of the turn-buckle are shaped. Fig. 7 is a vertical cross-section of the forging-dies on the line $x'$ $x'$ of Fig. 6. Fig. 8 is a side view, and Fig. 9 a plan view, of the finished buckle. Fig. 10 is a vertical cross-section on the line $x\,x$ of Fig. 8. Fig. 11 is an irregular cross-section on the line $x^2\,x^2$ of Fig. 7; and Fig. 12 is a view similar to Fig. 6, but showing a modified form of die.

Like symbols of reference indicate like parts.

I shall now describe the construction of the dies, and in setting forth their mode of operation I shall describe their use in the manufacture of turn-buckles.

The cutting dies or knives by which the turn-buckle blank is cut as a preliminary step in its manufacture are shown in Fig. 3. They comprise a suitable supporting-die, 15, having a concave receiving or supporting surface for the turn-buckle blank, and knives 16, which are fixed to the ends of moving plungers or knife-heads, and which work toward each other, the lower knife moving through a longitudinal slot or cavity in this die. The cutting-edges of the knives 16 are of the length of the cut desired to be made in the blank, and their sides are tapered and laterally curved, as shown in the drawings. In using these dies I take a hollow or tubular blank, 2, which may be of the form shown in Figs. 1 and 2, and place it in the cavity of the die 15, which holds and supports it laterally and on the under side. The knives 16 are then caused to approach and to engage the blank, and by reason of their peculiar conformation they not only cut the blank longitudinally, but fold in the material thereof upon itself and reduce it to the form shown in Fig. 3. The blank is then ready to be spread or expanded by means of the tools shown in Fig. 4. These tools comprise a supporting block or die, 18, having a cavity of proper size and shape to receive the blank, and a mandrel, 19, which is of about the same length as the knives 16, and is made with a wedge-shaped and outwardly-rounded end. The cavity of the supporting-block 18 is of the width desired for the spread blank, and when the longitudinally-cut blank is placed therein and the mandrel 19 is caused to descend it enters the cut formed by the knives 16 and spreads the cut or divided sides out laterally against the sides of the cavity and compresses and compacts the metal of the blank in contact therewith. The sides of this cavity, by limiting the spreading of the straps, insure uniformity in the size of the turn-buckle. In the use of these tools I prefer to cause the mandrel to enter the blank from one side, then to reverse the blank and to cause it to enter the other side thereof. The shape in cross-section of the blank after it has been acted upon by the mandrel is illustrated in Fig. 4. The cut and spread blank is then ready to be forged by the dies 8, 9, and 11. (Shown in Figs. 5, 6, and 7.) These comprise two dies, 8 and 9, which are provided with cavities or working-faces of the shape of the finished turn-buckle, and one or both of the dies have central tongues, 10, which are adapted to fit within the internal cavity of the buckle.

There are also end dies, 11, having cylindrical tongues or mandrels 12, which are adapted to enter cavities at the ends of the dies 8 and 9. The external diameter of the tongues or mandrels 12 is substantially the same as the internal diameter of the nuts of the finished buckle. The blank is then placed between the dies 8 and 9, so that these dies shall engage the sides of the blank, and the dies 11 are moved up, so that their tongues or mandrels 12 shall enter the cavities at the ends of the dies 8 and 9, and shall also enter the tubular ends of the blank, and so that the collars 13 at the bases of the mandrels 12 shall engage the ends of the turn-buckle blank, as shown in Fig. 6. The entrance of the tongues or mandrels 12 and collars 13 compresses and shapes the tubular ends of the blank and reduces them to proper form, as shown in Fig. 6, and the working-dies 8 and 9, acting upon the sides of the blank, shape the straps and reduce them to regular form, as clearly shown in Fig. 7. The dies 8, 9, and 11 are actuated by suitable cams, which give them a compressing action, as will be readily understood. The end compression of the collars 13 causes the metal at the ends of the blank to flow out laterally into proper cavities at the end portions of the dies around the nut portions of the blank, as shown at 25 in Fig. 11, so as to give the latter its proper shape and strength. When the article is taken out of the dies shown in Figs. 5, 6, and 7, it will have been reduced to the finished form, which is illustrated in Figs. 8 and 9, making it only necessary to remove by punching or drilling the thin shells of metal at the inner ends of the nuts.

Of course in shaping and acting on the blank by means of the dies hereinbefore described the blank should be first suitably heated to a welding heat. The buckle which is produced by their use is substantially uniform in structure, and is of very great strength.

Instead of constructing the dies 8 and 9 to operate on the whole of the blank at once, they may be so constructed as to weld and shape only a portion of it at a time, thus necessitating the treatment of the blank twice in the dies to complete it. I show such construction in Fig. 12.

I do not intend to limit myself to the use of the dies for the manufacture of turn-buckles according to the precise method which I have described, since they may be used in forming turn-buckles according to other methods and from differently-constituted blanks.

The advantages of the dies will be appreciated by those skilled in the art. The turn-buckles produced are very strong and compact, and the dies can be made and used with an economy of time and labor.

I claim as my invention—

1. An improvement in apparatus for making turn-buckles, which consists in the combination of the two opposite knives 16, having beveled or tapering sides, whereby a hollow blank interposed between the knives is slit longitudinally and the edges of the slit portion turned inward, substantially as and for the purposes described.

2. An improvement in apparatus for making turn-buckles, which consists in the combination of the two opposite knives 16, having beveled or tapering sides, whereby a hollow blank interposed between the knives is slit longitudinally and the edges of the slit portion turned inward, and a supporting-block, 15, which supports the blank laterally during the slitting operation, substantially as and for the purposes described.

3. The knife 16, having a cutting or slitting edge and tapering sides which are inwardly concaved or curved, whereby the knife is adapted to slit a hollow turn-buckle blank and to fold in the edges of the slit portion, substantially as and for the purposes described.

4. An improvement in apparatus for making turn-buckles, which consists in a mandrel, 19, for spreading or expanding the divided straps of a blank, said mandrel having a wedge-shaped working-edge, in combination with a supporting block or die, 18, having a cavity for receiving the turn-buckle, the width of the sides of the cavity being equal to the external width of the spread blank, whereby the mandrel shall expand the blank and shall compress the straps thereof against the sides of the cavity, substantially as and for the purposes described.

5. An improvement in apparatus for making turn-buckles, which consists in the combination of the shaping and forging dies 8 and 9, having working-faces provided with longitudinal cavities for the straps and end cavities for the heads or nuts of the buckles, substantially as and for the purposes described.

6. An improvement in apparatus for making turn-buckles, which consists in the combination of the dies 8 and 9, having working-faces provided with longitudinal cavities for the straps and end cavities for the heads or nuts of the buckle, and a compressing die or dies which enter between the dies 8 and 9 and engage the ends of the buckle, substantially as and for the purposes described.

7. An improvement in dies for making turn-buckles, which consists in the combination of the dies 8 and 9, having working-faces provided with longitudinal cavities for the straps, end cavities for the heads or nuts of the buckle, and a mandrel or mandrels at the end or ends of the dies which are adapted to enter the nuts of the buckle and which are provided with compressing portions 13, which engage and compress the ends of the blank, substantially as and for the purposes described.

In testimony whereof I have hereunto set my hand this 12th day of September, A. D. 1888.

JAMES H. SIMPSON.

Witnesses:
W. B. CORWIN,
THOMAS W. BAKEWELL.